United States Patent Office 2,721,853
Patented Oct. 25, 1955

2,721,853

COATED TITANIUM DIOXIDE PIGMENT

John W. Eastes, Somerville, and Theodore F. Cooke, Martinsville, N. J., assignors to American Cyanamid Company, New York, N. Y., a corporation of Maine No Drawing. Application December 10, 1952,
Serial No. 325,232

13 Claims. (Cl. 260—39)

The present invention relates to composite titanium dioxide pigments. More particularly, the present invention relates to titanium dioxide pigments of improved hydrophobic and organophilic properties consisting essentially of titanium dioxide particles coated with the hydrophobic, organophilic thermocured resinous reaction product of an alkylated methylol melamine and a N-alkylol fatty acid amide having a chain length of 12 to 20 carbon atoms. The invention includes the process of coating the pigments with a mixture or low molecular weight condensate of the melamine and the amide, and curing the coating to a water-insoluble, hydrophobic, organophilic condition at an elevated temperature. The coated titanium dioxide referred to is useful in the manufacture of surface coatings including lithographic inks.

The pigments of the present invention permit the easier and speedier formulation of paints and enamels which have increased chalk resistance, and the formulation of lithographic inks which have increased resistance to aqueous acids.

Lithography is the second of the three major divisions of printing and includes all the processes of printing from plane or slightly etched surfaces having both ink-receptive and ink-repellent areas, such as stone lithography and offset lithography. The principle underlying the processes is that grease and water are mutually repellent.

In stone lithography, a typical example of the art, a special slab of acid-sensitive stone is planed and smoothed and the surface is made perfectly grease-free. The design is placed on the stone either directly by means of a greasy crayon, or indirectly by transfer to the stone from a design or printed matter imprinted upon transfer paper using a greasy ink. The transfer paper is placed upon the stone and the design transferred by pressure.

In ordinary lithographic printing the surface of the printing stone must be wetted for each impression before the ink is applied to prevent the ink from adhering to the non-reproducing portions of the surface, and the presses are equipped with special wetting rollers for this purpose. A small amount of chromic or phosphoric acid, together with a little gum arabic, is added to the wetting solution (hereinafter called the "fountain solution") to etch the surface of the stone very slightly but continuously and thus keep the lines sharp. When the moistened stone is inked in the usual way, the ink adheres only to the greasy portion and is repelled from the moist or wet portions of the stone. The design is offset on paper as in the usual printing process.

It will be appreciated from the above that a pigment suitable for use in lithographic inks must possess most unusual properties. The pigment selected must have a strong affinity for the greasy design, and no affinity for the wet portions of the stone. It must be free from any tendency to bleed or disperse in the fountain solution as otherwise it will be deposited over the surface of the plate by the fountain solution causing local spots and even causing the paper to appear tinted or off-color. Then it must be very opaque and have as high a bulking value as is possible since in lithography it is impractical to deposit on the plate as large a volume of ink as is deposited in typographic printing. Then, the pigment must be free from any tendency to act as an emulsifying agent for the ink vehicle. Finally, the pigment must be stable and be reasonably unaffected by the fountain solution or the constituents of the ink vehicle.

The ink itself must also have special properties. Its viscosity and tack or adhesiveness must remain substantially constant during use. Its viscosity and tack should be sufficiently low to permit a sufficient amount of the ink to be picked up by the greased design, but insufficiently high to tear the greased design from the stone or plate. Then, the surface tension of the ink must not change unduly during use: if it drops, the ink, as it is rolled, may wet a large portion or even the entire surface of the plate or stone, bringing the printing operation to a halt.

Titanium dioxide has by far the highest opacity of any commercially available white pigment. In its ordinary or uncoated form, however, it is rapidly and completely dispersible in water and is therefore valueless for use in lithographic inks. A demand has accordingly arisen for a titanium dioxide pigment which will remain water-repellent in the presence of lithographic ink and fountain solution for extended periods, and permit the formation of lithographic inks of adequate stability to fountain solutions.

It has now been found that the above and other demands are substantially met by the coated pigments of the present invention. These pigments are prepared by slurrying titanium dioxide pigment particles with an aqueous dispersion of a mixture or low molecular weight condensate of a methylated methylol melamine and an alkylol fatty acid amide (hereinafter termed "methylolmelamine-fatty acid amide coating composition"), and heating the particles to dry the same and to cure the coating to a substantially infusible and insoluble condition. The size of the particles of the coating composition in the dispersion may range from 1 micron or smaller to 40–50 microns. Since the particles of titanium dioxide are smaller than 2 microns, it is evident that the size of the particles of coating composition is not critical.

It has been found that the coating thus applied is a strongly adherent one which is not noticeably removed either when the coated pigment is dry milled to the pigmentary range or when the pigment thus formed is ground in vehicles to provide a lithographic printing ink.

From the foregoing it will be seen that the product is best described as titanium dioxide pigment particles bearing a coating consisting essentially of the thermocured water-insoluble, hydrophobic, organophilic resinous reaction product of an alkylated methylol melamine and N-alkylol derivative of a saturated alkylamide having a chain length of 10 to 20 carbon atoms in which the N-alkylol substituent contains fewer than 4 carbon atoms, the weight of the alkylated methylol melamine to the amide being between about 1:5 and 2:1 and the weight of the cured coating being between about 0.5% and 10% of the weight of the titanium dioxide. This is equivalent to a mixture of 1 part by weight of the alkylated methylol melamine and from about ½ to 5 parts by weight of the amide. A ratio of about 1:1 is preferred, this ratio providing a coating of substantially maximum durability and water-repellence while appreciably reducing consumption of the methylated methylol melamine.

In the process as generally performed, the titanium dioxide (which may be of the anatase or rutile modification) is slurried with an aqueous dispersion of methylated melamine-fatty acid amide coating composition, and the slurry is then dried to a solid cake and the cake raised to an elevated temperature to develop the water-repellent properties of the applied mixture or low condensate. Even though the size of the dispersed particles of coating composition is many times larger than the particles of the titanium dioxide, the product is not a sintered or cemented mass. On the contrary, the product is essentially a mass of loosely-bound pigment particles coated with the methylolmelamine-fatty acid composition in a thermocured state, and the mass is readily disintegrated to yield ultimate discrete particles of titanium dioxide of pigmentary dimensions. The disintegrated particles are suitable for direct use as a pigment.

Being coated with a water-insoluble, hydrophobic resinous compound, the pigment is a free-flowing non-agglomerating powder which remains in this condition even on protracted storage. Moreover, the coating is insoluble in paint vehicles and ink solvents, and therefore the pigments of the present invention maintain their hydrophobic character when milled therewith.

According to one process of the present invention, titanium dioxide pigment particles, either dry or in the form of an aqueous slurry, are mixed with a dilute aqueous dispersion of the coating composition and the mixture is agitated until a homogeneous blend is obtained. The slurry is then dewatered and dried, and the recovered pigment is heated to develop the water-repellent and the acid-resistant properties of the coating. During this heating, the pigment may be in the form of a compact filter cake. The dried, cured pigment is composed of loosely bound aggregates which are readily disintegrated by a mortar and pestle or equivalent mechanical means such as a cage mill or crushing rolls. The product thus obtained is ready for formulation into a printing ink.

Any of the commercially available titanium dioxide pigments are benefited by the process of the present invention. Such pigments are produced by the calcination of a washed titanium sulfate hydrolysate, or by the combustion of titanium tetrachloride with oxygen. They may contain up to about 3% of combined zinc, aluminum, silicon and tin added before calcination or combustion to improve the chemical and physical characteristics of the pigment, and may be of the anatase or rutile configuration. Moreover the pigments, as commercially produced, may be provided with a coating totalling a few percent of silicic acid, or metal hydroxides such as aluminum hydroxide or zinc hydroxide or mixtures thereof. All such pigments are benefited by the present invention. Where the product is to be used in lithographic inks, however, the presence of aluminum hydroxide should be avoided. When an aluminum coated titanium dioxide is treated with the coating compositions referred to, a pigment is obtained which, while strongly water repellent and well adapted for use in paints and enamels, displays very little resistance to lithographic fountain solutions.

A distinctly water-repellent pigment is obtained when the weight of the coating is as little as 0.5% of the weight of the pigment. It is preferred, however, that the pigment contain 3% to 10% by weight of the coating material, and in this range the pigment exhibits very satisfactory water-repellence and resistance to fountain solution, while the danger of having too little coating present is avoided. Continued improvement in water-repellence takes place when the pigment contains more than 10% of the coating compositions. This, however, is accompanied by a reduction in the opacity of the pigment. The best compromise is therefore obtained when the weight of the coating is between 3% and 10% of the weight of the titanium dioxide.

The coating compositions referred to above are prepared preferably by mixing one part of methylated methylol melamine with 1 to 5 parts of stearamide, slightly more than 1 mol of $CH_2O$ per mol of stearamide, an anionic dispersing agent, and water to give about 50% solids, and heating at a pH of 8–9 until a clear solution is obtained. A temperature of about 180° C. is sufficient. The product is cooled with continuous slow stirring, forming a thick white paste. The paste is stable to storage, particularly when a few percent of ammonium hydroxide are added, and may be infinitely diluted with water. Before use, the dispersion is diluted with water to a solids content of 10%–15% to facilitate slurrying, and a small amount of latent acid catalyst such as ammonium sulfate added.

During the preparation of the coating composition, the fatty acid amide reacts with the formaldehyde to form N-methylol-stearamide, and on further heating this at least in part reacts with the methylated methylol melamine. The product when cool appears to be a homogeneous dispersion of particles ranging in diameter from about $1\mu$ to about $30$–$50\mu$ and are predominately larger than $10\mu$. However, according to infra-red data the particles contain some N-methylol stearamide in uncombined form, some of the methylol melamine in combined form, and lower reaction products or polymers thereof.

About 2% of the dispersing agent is used based on the combined weight of the amide and the methylated methylol melamine. The agent may be any one of the common anionic dispersing agents such as sodium stearate, the alkyl sulfonates, or the corresponding sulfates.

The amount of water used is roughly equal to the weight of the other ingredients, which provides a stirrable paste of substantially maximum concentration.

The methylated methylol melamine is added in the form of an aqueous solution, preferably concentrated, and for best results the methylated methylol melamine will be the reaction product of a melamine containing three or more methylol groups with two or more mols of alcohol.

The alkylated methylol melamines which are employed are prepared by known methods. Methylol melamine may, for example, be prepared by reacting 2 to 6 mols of formaldehyde with 1 mol of melamine to form condensation products hereinafter referred to as the methylol melamines. The methylol melamines are then reacted with 2 to 6 mols of methanol whereby water-soluble methylated methylol melamines are formed. The term methylated methylol melamine is intended to include all of these various substantially monomeric or polymerizable reaction products containing from 2 to 6 methylated methylol groups per molecule.

The invention is not limited to the use of methylated methylol melamines as illustrated above. Alkylated methylol melamines having short chain alkyl groups of not more than 4 carbon atoms, for example, the ethylated, isopropylated, and butylated methylol melamines may also be employed. In the curing, alcohol is split off and to effect a cure, higher temperatures and longer times are required in the case of the latter compounds than in the case of methylated methylol melamine. As a result, it is preferred to use the methylated methylol melamines. The weight of alcohol thus split off is a negligible fraction of the weight of the coating composition taken as a whole.

As to the amides, in general any fatty acid amide or thioamide having a chain length of 10 to 20 carbon atoms may be used. Included among these are such compounds as the corresponding cyanamides, ureas and thioureas, such as octadecylcyanamide, dodecylurea and hexadecylthiourea. It is within the scope of the present invention to react the amides referred to with formalin or other suitable aldehyde to form the N-alkylol derivatives of the amides. These alkylol derivatives may be used in the process described above equally well, and may be used in whole or in part to replace the formaldehyde-fatty acid amide mixture which is preferably employed.

Preferably the fatty acid chains will be derived from saturated monocarboxylic acids, and amides having a chain length of 16 to 18 carbon atoms are preferred. Unsaturated fatty acid groups are tolerated in amounts up to 10% of the total, but confer no advantage on the product.

In the curing step, the pigment need be maintained at a sufficiently high temperature for only sufficient time to develop the water-repellent properties of the coating, that is, until the hydrophobic properties of the pigment are substantially fully developed as measured by the pasting test, in which equal weights of water and pigment are pasted together, and the water-repellence of the pigment is measured as a function of the time necessary for the particles to become wet. Temperatures of about 100° C. or lower may be employed, but in this range several hours are usually required. Preferably the pigment is heated for about 3–10 minutes at between about 200° C. and 100° C., as under these conditions the coated pigment can be rapidly yet uniformly cured in ordinary equipment, and a highly water-repellent and well bonded coating is obtained. Higher temperatures may be employed causing a more rapid cure but leading to the danger of local overheating of the pigment or non-uniformity of results.

During the initial part of this heating the large particles of the melamine-amide composition soften or melt and flow around the much smaller pigment particles. On further heating the coating composition polymerizes. It is surprising that even when the weight of the coating composition is as much as 10% of the weight of the pigment the product is not a cemented block of pigment particles. On the contrary, the pigment particles are only loosely aggregated and are separated into their ultimate particles by only light disintegration.

The invention has been completely disclosed above. The examples which follow illustrate embodiments of the invention but do not constitute any limitation thereon.

*Example 1*

A master batch of stable autodispersible colloidal stearamide-methylated methylol melamine coating composition was prepared from the following materials.

|  | Parts |
|---|---|
| Stearamide | 30.5 |
| CH₂O, 37% aqueous | 9.5 |
| Dimethylated trimethylol melamine (80% aqueous solution) | 38.10 |
| Potassium hydroxide | 0.5 |
| Sodium isopropyl naphthalene sulfonate | 1.64 |
| Water | 19.76 |
| Total | 100.0 |

The materials were stirred and heated to 90° C. when a clear solution resulted and then cooled to room temperature with continued stirring, the heating and cooling being rapid to minimize polymerization. The calculated solids content of the composition was about 65%, the product being a stiff paste in which the particles ranged in size from 1 micron to about 50 microns, and were predominantly larger than 10 microns.

The composition was diluted and an acid catalyst incorporated as follows:

| | | |
|---|---|---|
| Dispersion as prepared | g | 16.7 |
| 28% NH₄OH | ml | 0.2 |
| (NH₄)₂SO₄ | g | 1.25 |
| Water | | 81.85 |
| Total | | 100.0 |

The solids content of this dispersion was about 12%.

800 g. of ordinary hydroclassified and milled titanium dioxide pigment (pigment 1–A) was slurried with 4.5 liters of water. The pigment was produced by the calcination of titanium sulfate hydrolysate in the presence of 0.8% of zinc sulfate calculated as ZnO and contained about 0.3% of water soluble salts, chiefly metallic phosphates and sulfates resulting from normal occlusion of these materials by the hydrolysate during its precipitation. To this slurry were added 4 g. of ZnSO₄.H₂O, sodium silicate equivalent (SiO₂ basis) to 0.25% of the weight of the titanium dioxide, and finally 40 parts of aluminum sulfate octadecylhydrate. During these additions the temperature of the slurry was about 50° C. After 30 minutes of stirring the pH was raised to 7.8 by the addition of aqueous NaOH. The slurry was dewatered, washed until free of soluble salts, and dried at about 110° C. The pigment thus prepared was coated with about 1% aluminum hydroxide, calculated as Al₂O₃, and with about 0.25% each of zinc hydroxide and silicic acid, calculated as ZnO and SiO₂ respectively. This pigment was designated as pigment 1–B.

Portions of pigments 1–A and 1–B were coated with the melamine-stearamide composition described above by the following uniform procedure.

To 250 ml. of water were added amounts of the diluted coating composition as shown in the table below and 250 parts of the titanium dioxide slowly run in with rapid stirring, giving in each instance a thin slurry. Stirring was continued for 30 minutes, at which time the particles were uniformly wet. The water was then removed by heating the slurries at temperatures up to 95° C. under 25 mm. of vacuum and the resulting cakes were broken up and pulverized in a mortar and pestle. The pigments were then heated at 142° C. for 25 minutes to cure the resin. The samples of pigment thus obtained were labeled with two identifying letters. The water repellence of the pigments was determined by passing 4 g. samples with 4 ml. of distilled water until wet. Results are as follows.

| Titanium Dioxide Used | Pigment No. | Percent Coating Cpd. Added [1] | Seconds To Wet |
|---|---|---|---|
| 1–A | | None | 0 |
| 1–B | | None | 0 |
| 1–A | AA | 0.35 | 6 |
| 1–A | AB | 1.4 | 87 |
| 1–A | AC | 3.5 | 112 |
| 1–A | AD | 7.1 | 268 |
| 1–B | BA | 2.8 | >50 |

[1] Solids in coating composition based on the weight of the titanium dioxide.

The results demonstrate that both ordinary titanium dioxide and titanium dioxide bearing an undercoating of aluminum hydroxide can be made strongly water-repellent by the use of the coating composition described above.

*Example 2*

A fountain solution was prepared by adding 20 parts of 85% H₃PO₄ and 10 parts of gum arabic to 1000 parts of water, and stirring until completely dissolved.

Lithographic inks were prepared from the pigments of Example 1 by grinding 150 parts of the respective pigments with 50 parts of No. 0 lithographic varnish. The resistance of the inks to lithographic breakdown was determined by adding 20 parts of ink to 100 parts of the fountain solution, subjecting the mixture to the action of an ink blender having rotating and intermeshing paddles, for 10 minutes, and allowing to stand for 15 minutes. The appearance of more than a slight milkiness in the water or the release of clumps of ink into the solution at the end of this time was considered to denote complete failure. Results are as follows:

| Titanium Dioxide Used | Pigment No.[1] | Coating Wt.[2] | Resistance to Fountain Solution [3] |
|---|---|---|---|
| | | *Percent* | |
| 1-A | | None | None. |
| 1-B | | None | Do. |
| 1-A | AA | 0.35 | Do. |
| 1-A | AB | 1.4 | Complete. |
| 1-A | AC | 3.5 | Do. |
| 1-A | AD | 7.1 | Do. |
| 1-B | BA | 2.8 | None. |

[1] Preparation described in Example 1.
[2] Based on weight of titanium dioxide.
[3] The inks which failed showed a marked tendency to body and broke up into very small pellets. The remaining inks were satisfactory in these respects.

The test demonstrates that ordinary titanium dioxide can be coated by the method described to provide lithographic inks of satisfactory resistance to fountain solution. The tests further show that pre-coating the titanium dioxide with aluminum hydroxide tends to negative the resistance thus imparted.

Pigments 1-A and AC were formulated into a paint to determine their mixing characteristics, their effect on the viscosity of the paint, their texture, and the chalk resistance of the paint, pigment 1-A being the chalk-resistant pigment of Example 1 characterized by its aluminum hydroxide coating, and pigment AC being pigment 1-A which had been further coated with 3.5% of its weight of the melamine-amide composition.

Paints were prepared from these pigments as follows:

250 gm. of the pigment in each instance was added to 100 parts of heat-bodied linseed oil (acid No. 4-6, saponification No. 189-195) in a laboratory change can mixer. The motor was started upon the addition of the pigment to the oil, and the total time required for the pigment and oil to form a firm ball and then "break" or form a mobile system was noted by a stopwatch. Mixing was continued for 5 additional minutes. Linseed oil was then added to the pastes to reduce their pigmentation to 61%. Mixing was continued for 3 minutes, and the resulting pastes were given two passes at a tight setting through a laboratory 3-roll mill. The viscosity and texture of the paste at this point were found to be substantially equal. The pastes were then let down to 25 parts of pigment by volume with thinner.

The paints thus prepared were applied to primed steel panels, dried for 48 hours, and tested in a laboratory twin arc weathering unit to determine the time at which initial chalking and final film breakdown occurred.

| Pigment | Mixing Time, min. | Weathering Results | | | | |
|---|---|---|---|---|---|---|
| | | 184 Hrs. | 323 Hrs. | 376 Hrs. | 404 Hrs. | 467 Hrs. |
| 1-A (control) | 150 | Trace | V. sl | Cons | Failed | |
| AC | 135 | do | Vv. sl | Sl | Cons | Failed. |

These tests demonstrate that the melamine-amide coating provides a pigment which can be made into paint at a saving in time and mechanical energy, and that the paints containing the pigments exhibit superior chalk resistance.

We claim:

1. As a new and useful composition of matter, titanium dioxide pigment particles bearing a coating consisting essentially of the thermocured water-insoluble, hydrophobic, organophilic resinous reaction product of an alkylated methylol melamine and a saturated alkylamide having a chain length of from 10 to 20 carbon atoms, and having a N-alkylol substituent containing fewer than 4 carbon atoms, the number of carbon atoms in each alkyl group of said alkylated methylol melamine being not more than 4, the weight of said alkylated methylol melamine to said amide being between about 1:5 and 2:1, and the weight of said coating being between 0.5% and 10% of the weight of the titanium dioxide.

2. A composition according to claim 1 in which the weight of the resinous coating is 3% to 10% of the weight of the titanium dioxide.

3. A composition according to claim 1 in which the melamine is an alkylated trimethylol melamine.

4. A composition according to claim 1 wherein the N-alkylol group is a N-methylol group.

5. A composition according to claim 1 in which the chain length of the fatty acid amide is 16-18 carbon atoms.

6. A composition according to claim 1 in which the weight of the alkylated methylol melamine to the weight of the amide is about 1:1.

7. A method of producing hydrophobic, organophilic titanium dioxide pigment particles which includes the steps of slurrying titanium dioxide pigment particles with an aqueous dispersion of a thermosetting alkylol methylolmelamine-fatty acid amide coating composition containing a latent acid catalyst, the weight of said dispersed coating composition being between 0.5% and 10% of the weight of said titanium dioxide, dewatering said slurry to obtain a substantially dry residue, and heating said residue to between about 100° C. and 200° C. to cure the coating composition and develop the hydrophobic properties thereof; said coating composition being a material selected from the group consisting of a mixture of 1 part by weight of an alkylated methylol melamine and one half to 5 parts by weight of a saturated alkylamide having a chain length of from 10 to 20 carbon atoms and having a N-alkylol substituent containing fewer than 4 carbon atoms, and low molecular weight thermosetting reaction products of said mixture.

8. A method according to claim 7 wherein the melamine is a dialkylated tri-methylol melamine.

9. A method according to claim 7 wherein the amide is a N-methylol amide.

10. A method according to claim 9 wherein the amide has a chain length of 16 to 18 carbon atoms.

11. A process according to claim 7 wherein the weight of the melamine to the weight of the amide is about 1:1.

12. A process according to claim 7 wherein the weight of the solids contained in said dispersion is 3% to 10% of the weight of the titanium dioxide.

13. A method of producing hydrophobic, organophilic titanium dioxide pigment particles which includes the steps of slurrying titanium dioxide pigment particles with an aqueous dispersion of a thermosetting methylated methylolmelamine-fatty acid-amide coating composition containing a latent acid catalyst, the weight of said dispersed coating composition being between 0.5% and 10% of the weight of said titanium dioxide, dewatering said slurry to obtain a substantially dry residue, heating said residue to between about 100° C. and 200° C. to develop the water-repellent properties of the coating composition, and disintegrating the aggregates of pigment which form, said coating composition being a material selected from the group consisting of a mixture of 1 part by weight of a methylated methylol melamine and one-half to 5 parts by weight of a N-methylol amide of a saturated fatty acid of 10 to 20 carbon atoms, and low molecular weight thermosetting reaction products of said mixture.

References Cited in the file of this patent

UNITED STATES PATENTS 2,525,835    Schmutzler    Oct. 17, 1950